United States Patent [19]

Cummins

[11] Patent Number: 5,842,748
[45] Date of Patent: Dec. 1, 1998

[54] VEHICLE SAFETY ACCESSORY

[76] Inventor: Pamela Robin Cummins, P.O. Box 2027, Port Macquarie, New South Wales, 2444, Australia

[21] Appl. No.: 959,266

[22] Filed: Oct. 28, 1997

[30] Foreign Application Priority Data

Oct. 15, 1997 [AU] Australia ................................ 40127/97

[51] Int. Cl.⁶ ............................................... B60J 3/02
[52] U.S. Cl. .......................................... 296/97.2; 296/97.8
[58] Field of Search .................................... 296/97.8, 97.2

[56] References Cited

U.S. PATENT DOCUMENTS

| | | | |
|---|---|---|---|
| 4,264,100 | 4/1981 | Keler, II | 296/97.8 |
| 4,828,314 | 5/1989 | Gavagan | 296/97.8 |
| 4,988,139 | 1/1991 | Yamada | 296/97.8 X |
| 4,989,910 | 2/1991 | Mersman et al. | 296/97.8 X |
| 5,206,764 | 4/1993 | Lamoglia | 296/97.8 X |
| 5,261,717 | 11/1993 | Tsumura et al. | 296/97.2 |
| 5,513,892 | 5/1996 | Thomas | 296/97.2 |

FOREIGN PATENT DOCUMENTS 2332613  1/1975  Germany ................................ 296/97.8

*Primary Examiner*—Joseph D. Pape
*Attorney, Agent, or Firm*—David P. Gordon; David S. Jacobson; Thomas A. Gallagher

[57] ABSTRACT

A sun visor (10) for a motor vehicle comprises an opaque visor member (12) with internal guide tracks (24) for receiving a support rail (22) of a transparent, glare reducing panel (20). The glare reducing panel is movable between a retracted position within the visor member and an extended position in which it creates a non-glare visual region below the opaque visor member. An additional, smaller panel (38) may overlie a portion of panel (20) and be adjustable in position, to create an enhanced glare reduction portion which may be aligned with the direction of the sun.

9 Claims, 1 Drawing Sheet

VEHICLE SAFETY ACCESSORY

BACKGROUND OF THE INVENTION

The invention relates to a vehicle safety accessory, and more specifically to an improved sun visor assembly for a motor vehicle.

DESCRIPTION OF THE PRIOR ART

Known sun visors comprise an upholstered visor pivotably mounted on an L-shaped support arm attached to the vehicle interior ceiling and able to be pivoted down from a horizontal position against the ceiling to a functional, downwards position which obscures the upper part of the vehicle windscreen. The support arm is usually pivotably mounted to its support plate to allow the visor to be swung around parallel to the vehicle side window.

The existing sun visors are an important vehicle safety accessory and function well in most conditions to keep the sun's glare out of the driver's eyes. However, there are circumstances where the existing visors do not achieve their aims, especially where the sun is low in the sky or the driver is short in stature.

SUMMARY OF THE INVENTION

The present invention thus provides a sun visor for a motor vehicle, including an opaque visor member attached to the vehicle interior for movement between a first position in which the visor member obscures a first visual region corresponding to an upper part of the vehicle windscreen and a second position in which the visor member does not obscure said first visual region, and a substantially transparent glare reducing panel extendible from the visor member in said first position to create a second visual region of reduced glare below the first visual region.

Preferably, the glare reducing panel in its retracted position is substantially parallel and adjacent the visor member, so as to cause substantially no impediment to the driver's vision. More preferably, the panel slides inside the visor member, with only a handle protruding.

Desirably, the sun visor also includes a glare reducing member overlying a portion of the glare reducing panel to form a portion of the second visual region having further enhanced glare reduction. Preferably, the position of this glare reducing member is adjustable.

BRIEF DESCRIPTION OF THE DRAWINGS

Further preferred embodiments will now be described with reference to the accompanying drawings, in which.

DETAILED DESCRIPTION OF THE PREFERRED EMBODIMENTS

Figure 1:
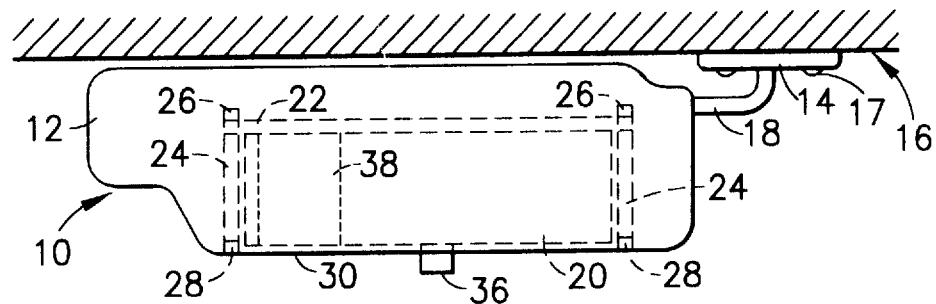
FIG. 1 is a rear elevation of a preferred sun visor construction with the glare reducing panel retracted.
Figure 2:
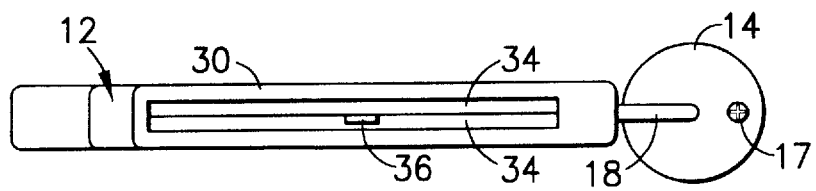
FIG. 2 is an inverse plan view of FIG. 1.

With reference to FIGS. 1 and 2, the sun visor 10 has an opaque visor member 12 which may be constructed generally as a frame (not shown) covered with upholstery matching the vehicle's interior, as well known in the art. The sun visor support arrangement, consisting of a support plate 14 secured to the vehicle ceiling 16 by screws 17, and a pivotable, L-shaped support arm 18 will also be well understood by the skilled addressee.

Figure 3:
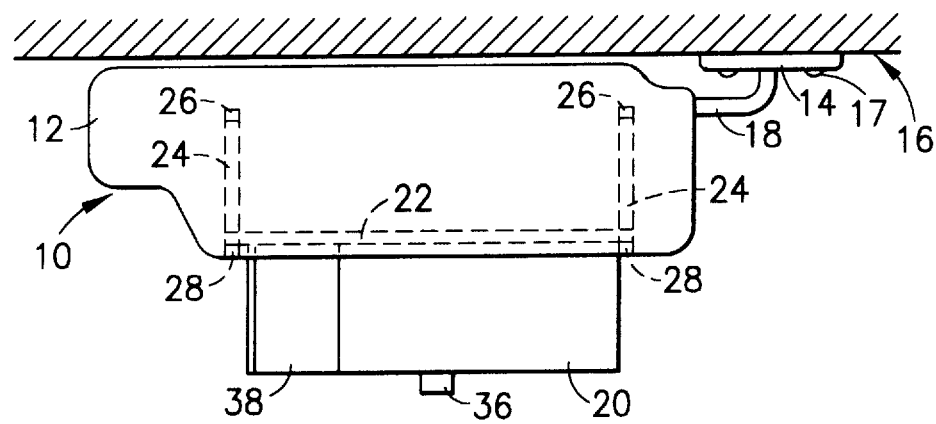
FIG. 3 is a rear elevation of the sun visor of FIG. 1, with the glare reducing panel extended.
Figure 4:
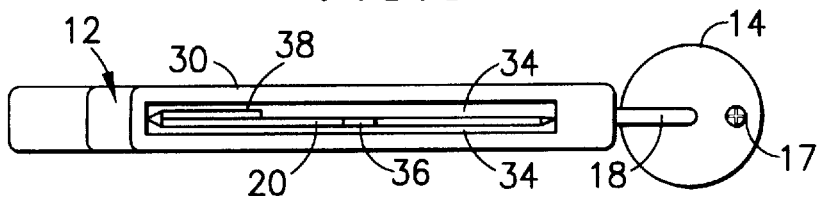
FIG. 4 is an inverse plan view of FIG. 3.

The sun visor of FIGS. 1 to 4 departs from the standard prior art arrangement by inclusion of a substantially transparent, glare reducing panel 20 movable from its retracted position (shown in ghost in FIG. 1) inside the visor member 12 to the extended position shown in FIGS. 3 and 4.

The panel 20 is supported along its upper edge by a support rail 22 capable of vertical movement within guide tracks 24 fixed to the internal frame of the sun visor. The upper and lower limits of movement are defined respectively by upper stops 26 and lower stops 28 in the guide tracks.

The panel 20 is substantially transparent, in the sense that it allows substantially undistorted visibility therethrough, but has glare reducing properties. Preferably the panel is tinted, although alternatively or additionally the panel may be polarised and may additionally have ultraviolet filtering properties.

The panel is preferably formed of plastics sheet material of sufficient thickness and rigidity to maintain its shape during normal use, but display a degree of flexibility under impact conditions in case of collision. The optical properties of the panel may be imparted integrally into the plastics material or applied by means of a film.

As seen from FIG. 2, the bottom edge 30 of the opaque visor member 12 has an elongate opening of length slightly greater than panel 20. The opening is surrounded by lips 34 of rubber or similar material which are resiliently closed when the panel is in the retracted position, such that only a small handle 36 on the bottom of panel 20 protrudes below the bottom edge 30 of the visor member. The handle 36 is sufficiently small to not be a conspicuous impediment to the driver's vision but large enough to be gripped for withdrawal of the panel 20 from the visor member.

The resilient lips 34 assist in retaining the panel 20 in its retracted position.

Also apparent from FIG. 1 is a smaller glare reducing member in the form of a second tinted panel 38 of similar material and construction to panel 20. This second panel is slidably mounted at its upper edge to the support rail 22, as will be discussed below with reference to FIGS. 3 and 4.

FIGS. 3 and 4 show panel 20 in its extended position below the opaque visor member 12 and support rail 22 resting on the lower stops 28 of the guide tracks 24. With reference to FIG. 4 it can be seen that the resilient lips 34 of the opening part just enough to allow the panel to pass through.

The glare reducing panel 20 thus extends below the opaque visor member 12 to create a non-glare but transparent visual region below the opaque region.

The smaller tinted panel 38 overlies a portion of the large panel to create a smaller region of intense glare reduction. The position of this region may be adjusted by sliding the smaller panel to the desired position aligning directly with the sun, and is retained in that position by the resilience of the lips. The small panel 38 may also have a handle or recessed portion (not shown) to assist movement without leaving fingerprints on the panel.

It will be appreciated that the invention may be embodied in other specific forms without departing from the scope hereof. For example, the panel 20 and its support assembly may be mounted externally to the opaque visor member, for example by mounting the guide tracks 24 on the rear surface of the visor member. As this surface will be against the vehicle ceiling when the sun visor is not in use, this may result in an acceptable aesthetic appearance although not as neat as the illustrated embodiment. Also, the panel may be mounted otherwise than by sliding, for example by hinging the bottom edge of panel 20 onto the rear surface of the opaque visor member.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein.

I claim:

1. A sun visor for a motor vehicle having a windscreen with an upper part, comprising:
   a) an opaque visor member which obscures a first visual region corresponding to the upper part of the windscreen;
   b) a first substantially transparent glare reducing panel having a length and extendible from said visor member to create a second visual region below the first visual region, said second visual region having a first glare reduction relative to the windscreen; and
   c) a second substantially transparent glare reducing panel adjustably movable substantially along and over said length of said first glare reducing panel so that the first and second glare reducing panels co-operate to form a subregion of the second visual region, said subregion having an increased glare reduction relative to the first glare reduction.

2. A sun visor according to claim 1, wherein:

said second glare reducing panel is sized such that said subregion extends substantially along an entire height of said second visual region.

3. A sun visor according to claim 1, wherein:

said first glare reducing panel is movable into a retracted position substantially parallel and adjacent to said visor member.

4. A sun visor according to claim 3, wherein:

said first glare reducing panel in said retracted position is positioned inside said visor member.

5. A sun visor according to claim 4, wherein:

said first glare reducing panel is slidable from said retracted position into said extended position.

6. A sun visor according to claim 3, wherein:

said first glare reducing panel includes a handle which extends outside said visor member when said first glare reducing panel is in said retracted position.

7. A sun visor according to claim 3, wherein:

said visor member includes an opening and said first glare reducing panel is retractable into said visor member through said opening.

8. A sun visor according to claim 7, wherein:

visor member resiliently engage said first glare reducing panel about said opening.

9. A sun visor according to claim 7, wherein:

said visor member resiliently closes about said opening to retain said first glare reducing panel in said retracted position.

* * * * *